US008250236B2

(12) United States Patent
Betts et al.

(10) Patent No.: US 8,250,236 B2
(45) Date of Patent: Aug. 21, 2012

(54) METHOD AND APPARATUS FOR TRANSLATING A WEB SERVICES ADDRESS

(75) Inventors: Christopher Betts, Mount Dandenong (AU); Tony Rogers, Rowville (AU)

(73) Assignee: CA, Inc., Islandia, NY (US)

( * ) Notice: Subject to any disclaimer, the term of this patent is extended or adjusted under 35 U.S.C. 154(b) by 1246 days.

(21) Appl. No.: 11/089,796

(22) Filed: Mar. 25, 2005

(65) Prior Publication Data

US 2005/0234923 A1 Oct. 20, 2005

Related U.S. Application Data

(63) Continuation of application No. 10/888,762, filed on Jul. 9, 2004, now abandoned.

(60) Provisional application No. 60/486,785, filed on Jul. 11, 2003.

(51) Int. Cl.
*G06F 15/16* (2006.01)

(52) U.S. Cl. ........................................ 709/245; 709/246

(58) Field of Classification Search .................. 709/245, 709/246, 230
See application file for complete search history.

(56) References Cited

U.S. PATENT DOCUMENTS

| 6,055,236 A * | 4/2000 | Nessett et al. ................ 370/389 |
| 6,687,746 B1 * | 2/2004 | Shuster et al. ................ 709/223 |
| 6,993,595 B1 * | 1/2006 | Luptowski et al. ........... 709/245 |
| 2002/0138622 A1 * | 9/2002 | Dorenbosch et al. ......... 709/227 |
| 2002/0178244 A1 | 11/2002 | Brittenham et al. .......... 709/223 |
| 2003/0110292 A1 * | 6/2003 | Takeda et al. ................ 709/245 |
| 2003/0187841 A1 * | 10/2003 | Zhang et al. ................. 707/4 |
| 2004/0215826 A1 * | 10/2004 | Pfitzner ...................... 709/245 |

OTHER PUBLICATIONS

EPO Communication pursuant to Article 96(2) EPC; Application No. 04 785 829.5-1225; Ref. HCD/J00048480EP; Applicant: Computer Associates Think, Inc., Oct. 15, 2007.
Salz, Rich: "Essential XML Web Services Security Practices" Proceedings by deepX Ltd., [Online] 2003, Cambridge, USA Retrieved from the Internet: URL:http://www.idealliance.org/papers/dx_xml03/papers/05-04-02/05-04-02.pdf, Retrieved on Oct. 5, 2007.
Notification of Transmittal of the International Search Report and the Written Opinion of the International Searching Authority, or the Declaration; International Application No. PCT/US2004/022321; Applicant's or Agent's File Reference: 0655/69817-PCT, Mailed Jan. 21, 2005.
Norman H. Cohen et al.: "iQueue: A Pervasive Data Composition Framework"; 0-7695-1500-2; XP-010587798, Jan. 8, 2002.
Milan Milenkovic et al.: "Toward Internet Distributed Computing"; Computer IEEE Comput. Soc USA, vol. 36, No. 5; XP-002312636, May 2003.
Reiner Kraft: "Research and Design Issues in Access Control for Network Services on the Web"; International Conference; Internet Computing, Online! Mar. 2002; Retrieved from the Internet: URL:http://www.soe.ucsc.edu/{rekraft/papers/Kraft%201023IC.pdf; XP-002312638, Retrieved on Jan. 6, 2004.

* cited by examiner

*Primary Examiner* — Thu Nguyen
*Assistant Examiner* — Joseph Greene
(74) *Attorney, Agent, or Firm* — Baker Botts L.L.P.

(57) ABSTRACT

A method for translating a web services address, includes receiving a first web services address, determining a format for the first web services address, transforming the first web services address to a second web services address based on the determined format and outputting the second web services address.

24 Claims, 4 Drawing Sheets

METHOD AND APPARATUS FOR TRANSLATING A WEB SERVICES ADDRESS

REFERENCE TO RELATED APPLICATIONS

This is a continuation of application Ser. No. 10/888,762 filed Jul. 9, 2004 now abandoned which claims the benefit of Provisional application No. 60/486,785 and filed in the United States on Jul. 11, 2003.

BACKGROUND

1. Technical Field

The present disclosure relates generally to web services and, more particularly, to a method and apparatus for translating a web services address.

2. Description of the Related Art

Web services are automated resources that can be accessed via the Internet and provide a way for computer systems to communicate with one another. Computer system(s) as referred to herein may include(s) individual computers, servers, computing resources, and/or networks, etc. Generally, a web service may be a function exposed by a web server and accessed by a client application. Web services use "Extensible Markup Language" (XML) to transmit data. XML is a human readable language that is used for tagging the data that is used by web services.

XML-based web services are becoming increasingly important in the world of enterprise computing. A combination of open standards, platform independence that is, to some extent, self-describing and human-readable has created a great deal of growth in new web services, and in adding web services interfaces to existing programs. This has resulted in large numbers of web services, often interacting with each other, and sometimes interacting with web services from other enterprises.

Such a large number of interacting web services may be difficult to manage. When a web service changes its address or details, all the other web services relying on it should be updated as well. This has led to the creation of the "Universal Discovery, Description and Integration" (UDDI) standard. UDDI is a web based globally distributed directory that exposes information about service providers, service implementations, and service metadata. UDDI is similar to a phone book's yellow pages and can be used by web services as a central repository—a "yellow pages" of web services where web addresses and details may be looked up.

However, web services are particularly vulnerable to security attacks because they use standard HTTP communications over "port 80" (not included in the Figures), a port through which firewalls are set up to allow inbound and outbound web-oriented traffic through. Therefore, because most firewalls do not block communications on port 80, critical operations of enterprises may be exposed to outsiders. For example, the address of a web service may be, http://myserver.companyA.com/apache/axis/dataserver. The name of this address tells a user that there is an internal server called "myserver.companyA.com", and suggests that it may be running the well known "Apache" web server, with the common "Axis" servlet runner. If an intruder finds a bug in either Apache or Axis, they may easily begin an attack on this web service.

Accordingly, it would be beneficial to provide a reliable and effective way to translate web services in order to prevent the public from accessing the details and structure of internal systems.

SUMMARY

A method for translating a web services address, comprises receiving a first web services address, determining a format for the first web services address, transforming the first web services address to a second web services address based on the determined format, and outputting the second web services address.

An apparatus for translating a web services address, comprises a first port for receiving a first web services address, a unit for determining a format for the first web services address, a unit for transforming the first web services address to a second web services address based on the determined format, and a second port for outputting the second web services address.

A computer storage medium including computer executable code for translating a web services address, comprises code for receiving a first web services address, code for determining a format for the first web services address, code for transforming the first web services address to a second web services address based on the determined format, and code for outputting the second web services address.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides tools (in the form of methodologies, apparatuses, and systems) for translating a web services address. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
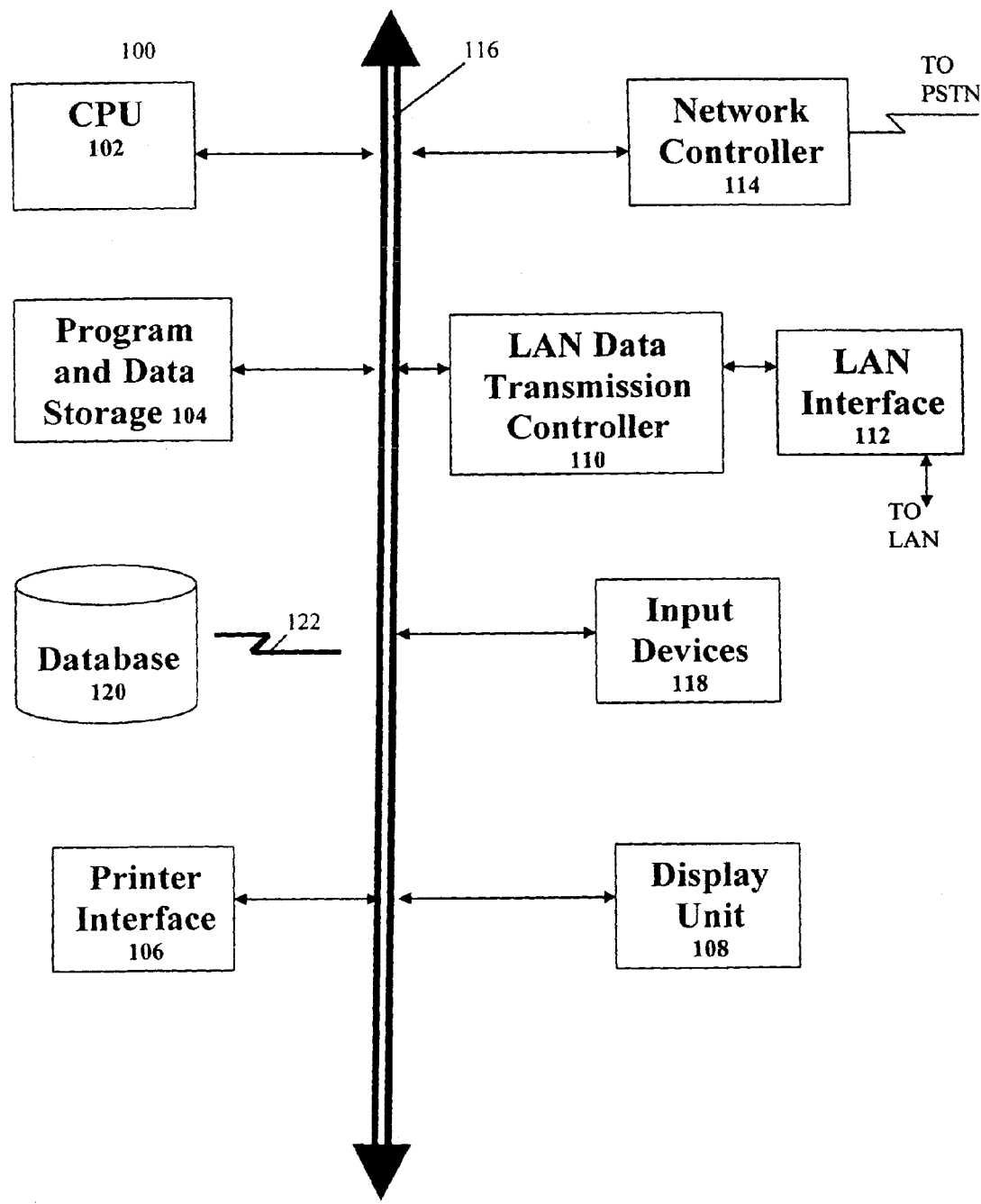
FIG. 1 shows a block diagram of an exemplary computer system capable of implementing the method and system of the present disclosure.

FIG. 1 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

The specific embodiments described herein are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Figure 2A:
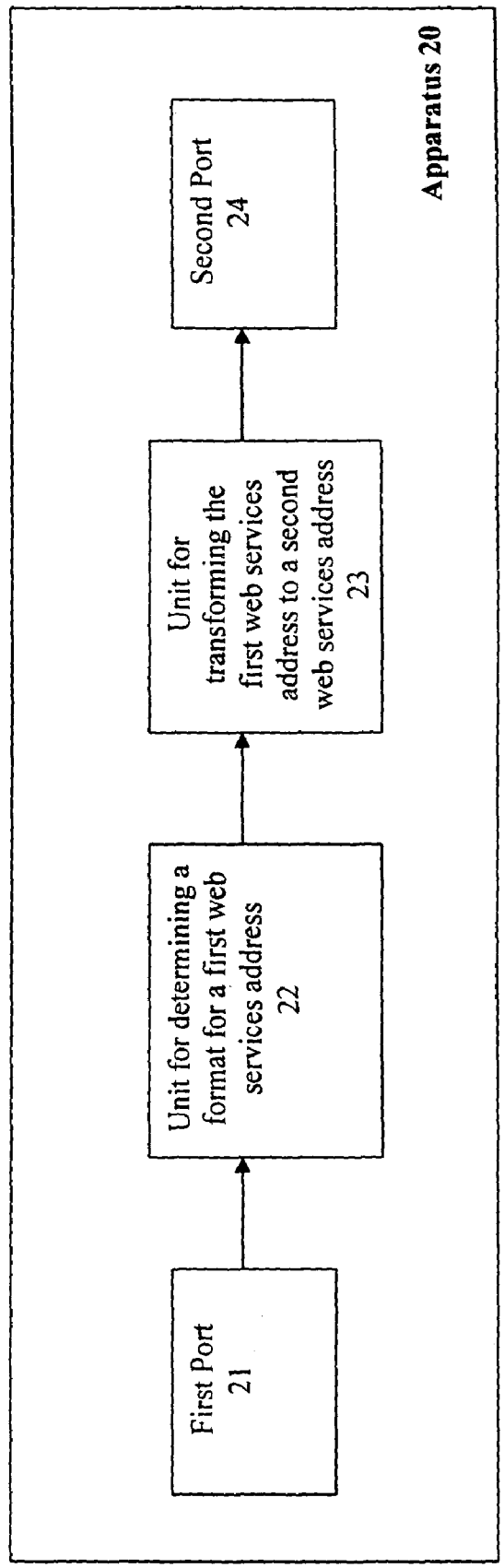
FIG. 2A shows a block diagram illustrating an apparatus for translating a web services address, according an embodiment of the present disclosure.

An apparatus for translating a web services address, according to an embodiment of the present disclosure, will be described with reference to FIG. 2A. The apparatus 20 includes a first port 21 for receiving a first web services address, a unit for determining a format for the first web services address 22, a unit for transforming the first web services address to a second web services address 23 based on the determined format, and a second port 24 for outputting the second web services address.

Figure 2B:
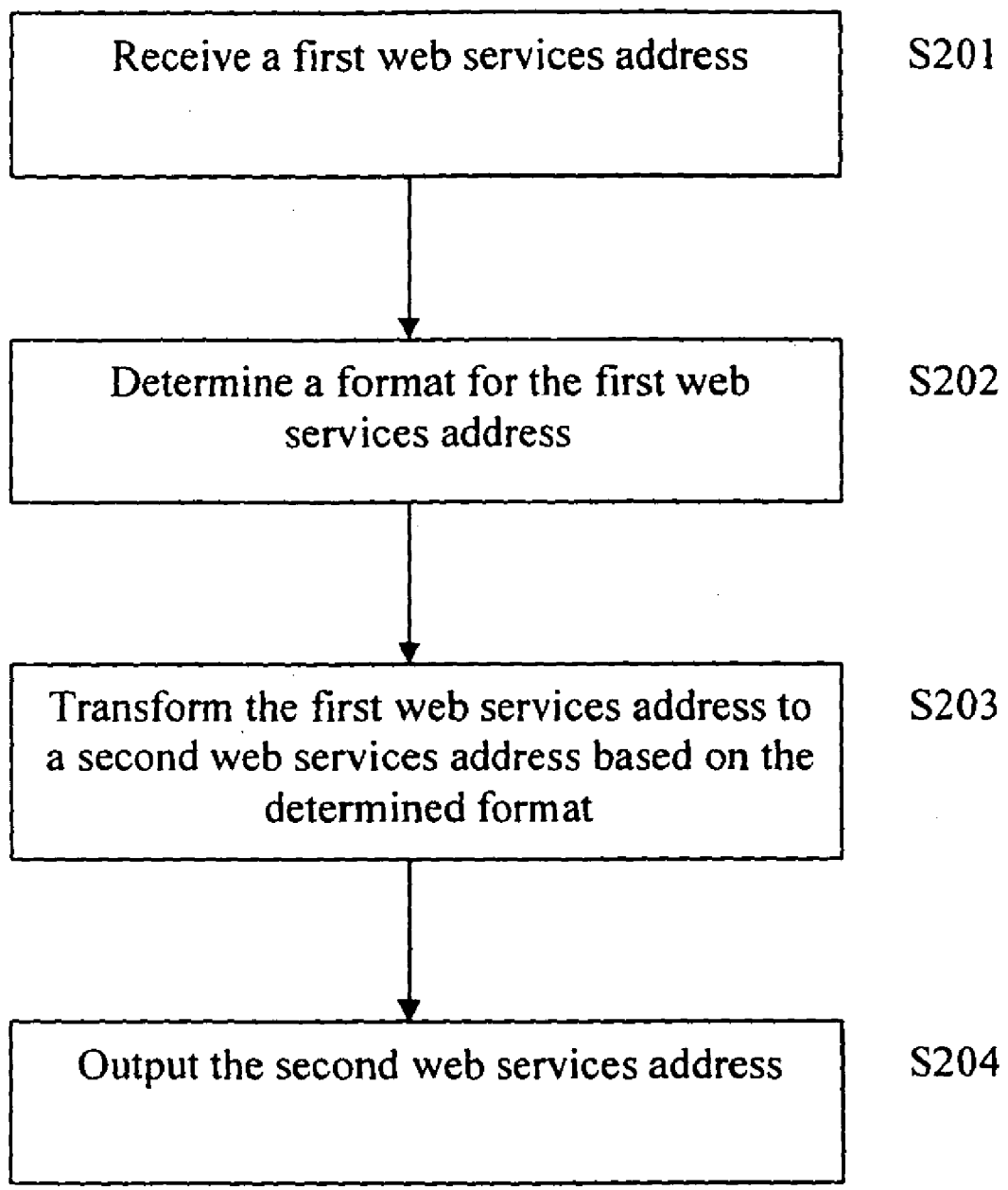
FIG. 2B shows a flow chart illustrating a method for translating a web services address, according to an embodiment of the present disclosure.

A method for translating a web services address, will be explained below with reference to FIGS. 2A and 2B. A first web services address is received (Step S201) by the first port 21. The unit for determining 22 determines a format for the first web services address (Step S202). The unit for transforming 23 transforms the first web services address to a second web services address based on the determined format (Step S203). A second port 24 outputs the second web services address (Step S204).

The first web service address may include, for example, a machine name, a port number, and/or a Uniform Resource Locator (URL) path, etc. according to an embodiment of the present disclosure. The second web services address may comprise any one or a combination of the machine name, the port number, or the URL path. The format may be an internal web services address or a public web services address. If the first web services address is in a public web services address format, then the second web services address may be in an internal web services address format. Similarly, if the first web services address is in an internal web services address format, then the second web services address may be in a public web services address format.

The first web services address may be transformed into a second web services address in accordance with predetermined mapping criteria, according to an embodiment of the present disclosure. The predetermined mapping criteria may be stored in a Universal Description and Discovery Integration (UDDI) repository.

An enterprise may want to allow the use of an internal web service, without making public either the service's name, location, calling convention, etc. For example, the enterprise may want to disguise the true name of a web service to make it difficult for outside users to learn the structure of the internal system. The method and apparatus of the present disclosure provide a web services intermediary that may be used as a gateway between the enterprise and the outside world. By using a repository, such as a UDDI repository, as a data store, the web services intermediary may translate each service's "public" name and address (for example, URL) and even its calling convention, parameters, etc. (for example, Web Services Description Language (WSDL)) to a name and address that may be used by an internal service.

Figure 3:
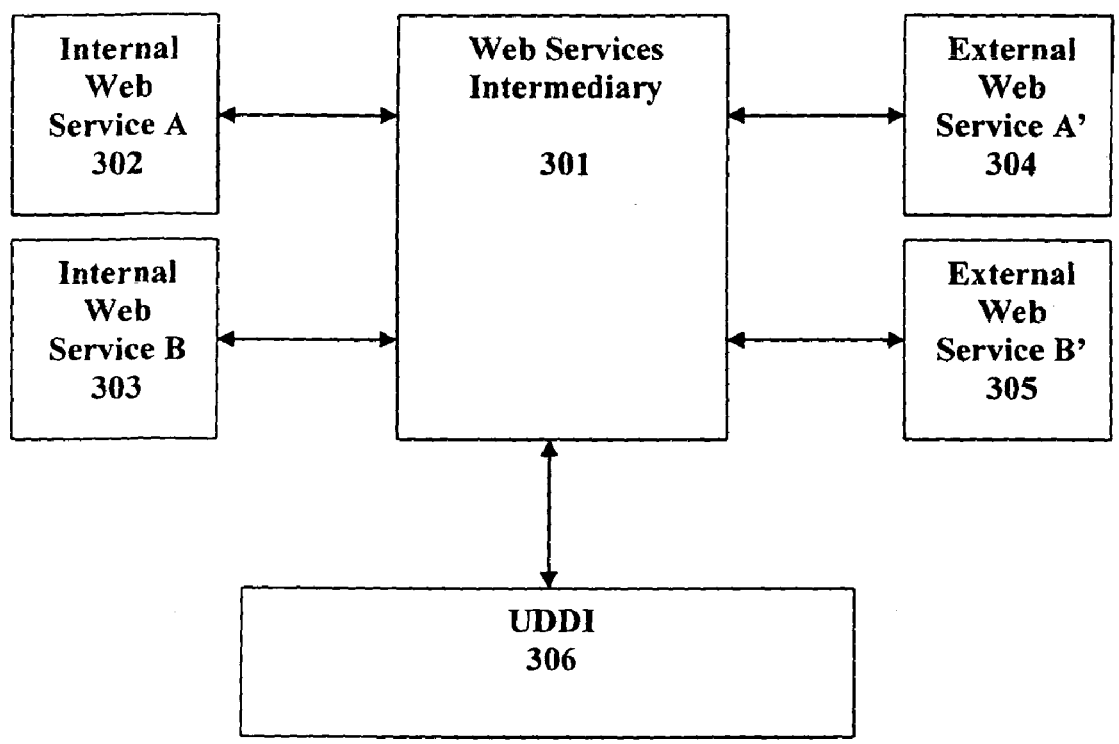
FIG. 3 shows a block diagram illustrating an apparatus for translating a web services address, according to an embodiment of the present disclosure.

FIG. 3 is a block diagram illustrating an apparatus for translating a web services address, according to an embodiment of the present disclosure. A web services intermediary 301 may operate between internal web services 302, 303 and external web services 304, 305. In other words, the web services intermediary 301 may translate a web services address to keep the interior details of the web service hidden from the public face of the web service. Web services may often change their names, requirements, servers, details, etc. as they are developed. As a result, if a large number of web services are involved, it may be difficult to manage their changes. In order to effectively manage the web services, a UDDI server 306, or similar implementation, may be used to look up and discover web services addresses and calling conventions. The web services intermediary 301 may operate in conjunction with a UDDI server 306. The web services intermediary 301 may query the UDDI server 306 to obtain the current nature of the web services that it may be managing. This allows the internal web services 302, 303 to maintain an exterior view of the web services, in other words, to maintain the external web services 304, 305. For example, internal web service 302 may have an internal address of http://myserver.companyA.com/apache/axis/dataserver. This internal address reveals all the details of the web service and allows intruders to easily target attacks on the web service. The web services intermediary 301 may translate the internal address to an external address of http://companyA.com/dataserver by using the UDDI server 306 to look up the address for the internal web service 302. The external address is then sent to the corresponding external web service 304.

According to an embodiment of the present disclosure, the web services intermediary 301 may translate Web Services Description Language (WSDL) details. WSDL may be considered the "user manual" for web services and is an XML-based format for specifying the interface to a web service. For example, the WSDL may detail the web service's available methods and parameter types. The web services intermediary 301 may suppress functionality that a web services publisher does not want to make available or may change the names or types of the call parameters. For example, a corporation may not want to publicize the fact that they may subcontract services from a competitor. In this situation, the web services intermediary 301 may hide this internal information from external web services 304, 305.

According to an embodiment of the present disclosure, the method and apparatus of the present disclosure may be used to link separate regions within an enterprise, in order to insulate each region, provide safety compartmentalization, and/or just to simplify administration, etc.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for translating a web services address, comprising:
   receiving at an apparatus a first web services address, the first web services address comprising a Uniform Resource Locator (URL), the URL including one or more elements that identify a name of a web service utilized by a web server;

determining by the apparatus a format for the first web services address;

transforming the first web services address to a second web services address based on the determined format, wherein the transforming the first web services address to the second web services address comprises modifying the URL to remove the one or more elements that identify the name of the web service in order to disguise the web service, second web services address comprising a URL that does not include any element that identifies the name of the web service; and outputting the second web services address that does not include any element that identifies the name of the web service as a public name for the web service as seen by a user, and wherein the first web service address further comprises Web Services Description Language (WSDL) detailing one or more call parameters, and wherein the transforming the first web services address to the second web services address further comprises modifying the WSDL.

2. A method for translating a web services address, comprising: receiving at an apparatus a first web services address, the first web services address comprising a Uniform Resource Locator (URL), the URL including one or more elements that identify a name of a web service utilized by a web server; determining by the apparatus a format for the first web services address; transforming the first web services address to a second web services address based on the determined format, wherein the transforming the first web services address to the second web services address comprises modifying the URL to remove the one or more elements that identify the name of the web service in order to disguise the web service, second web services address comprising a URL that does not include any element that identifies the name of the web service; and outputting the second web services address that does not include any element that identifies the name of the web service as a public name for the web service as seen by a user, and wherein the first web service address further comprises Web Services Description Language (WSDL) detailing one or more call parameters, and wherein the transforming the first web services address to the second web services address further comprises modifying the WSDL; and wherein the first web service address further comprises at least one of a machine name and a port number, and wherein the second web services address further comprises at least one of the machine name and the port number.

3. The method of claim 1, wherein the format is an internal web services address or a public web services address.

4. The method of claim 3, wherein the second web services address is a public web services address if the first web services address is in an internal web services address format.

5. The method of claim 1, wherein the first web services address is transformed into the second web services address in accordance with predetermined mapping criteria.

6. The method of claim 1, further comprising storing, in a Universal Description and Discovery Integration (UDDI) repository, a mapping of the first web service address comprising the URL including the one or more elements that identify the name of the web service to the second web service address comprising the URL that does not include any element that identifies the name of the web service.

7. An apparatus for translating a web services address, comprising:

a computer system comprising:

a first port for receiving a first web services address, the first web services address comprising a Uniform Resource Locator (URL), the URL including one or more elements that identify a name of a web service utilized by a web server; and a central processor unit (CPU) operable to:

determine a format for the first web services address;

transform the first web services address to a second web services address based on the determined format, wherein the transforming the first web services address to the second web services address comprises modifying the URL to remove the one or more elements that identify the name of the web service in order to disguise the web service, second web services address comprising a URL that does not include any element that identifies the name of the web service; and a second port for outputting the second web services address that does not include any element that identifies the name of the web service as a public name for the web service as seen by a user, and wherein the first web service address further comprises Web Services Description Language (WSDL) detailing one or more call parameters, and wherein the transforming the first web services address to the second web services address further comprises modifying the WSDL.

8. The apparatus of claim 7, wherein the first web service address further comprises at least one of a machine name and a port number, and wherein the second web service address further comprises at least one of the machine name and the port number.

9. The apparatus of claim 7, wherein the format is an internal web services address or a public web services address.

10. The apparatus of claim 9, wherein the second web services address is a public web services address if the first web services address is in an internal web services address format.

11. The apparatus of claim 7, wherein the first web services address is transformed into the second web services address in accordance with predetermined mapping criteria.

12. The apparatus of claim 7, further comprising a Universal Description and Discovery Integration (UDDI) repository storing a mapping of the first web service address comprising the URL including the one or more elements that identify the name of the web service to the second web service address comprising the URL that does not include any element that identifies the name of the web service.

13. A non-transitory computer readable storage medium including computer executable code for translating a web services address, comprising:

code for receiving a first web services address, the first web services address comprising a Uniform Resource Locator (URL), the URL including one or more elements that identify a name of a web service utilized by a web server;

code for determining a format for the first web services address;

code for transforming the first web services address to a second web services address based on the determined format, wherein the transforming the first web services address to the second web services address comprises modifying the URL to remove the one or more elements that identify the name of the web service in order to disguise the web service, second web services address comprising a URL that does not include any element that identifies the name of the web service; and code for outputting the second web services address that does not include any element that identifies the name of the web service as a public name for the web service as seen by a user, and wherein the first web service address further comprises Web Services Description Language (WSDL) detailing one or more call parameters, and wherein the transforming the first web services address to the second web services address further comprises modifying the WSDL.

14. The computer readable storage medium of claim 13, wherein the first web service address further comprises at least one of a machine name and a port number, and transforming the first web service address comprises removing at least one of the machine name and the port number.

15. The computer readable storage medium of claim 13, wherein the format is an internal web services address or a public web services address.

16. The computer readable storage medium of claim 15, wherein the second web services address is a public web services address if the first web services address is in an internal web services address format.

17. The computer readable storage medium of claim 13, wherein the first web services address is transformed into the second web services address in accordance with predetermined mapping criteria.

18. The computer readable storage medium of claim 13, further comprising code for storing, in a Universal Description and Discovery Integration (UDDI) repository, a mapping of the first web service address comprising the URL including the one or more elements that identify the name of the web service to the second web service address comprising the URL that does not include any element that identifies the name of the web service.

19. The method of claim 1 further comprising receiving a request from the user for the web service utilized by the web server, the request identifying the web service by the second web service address that does not include an element that identifies the name of the web service.

20. The apparatus of claim 7 wherein the first port is further operable to receive a request from the user for the web service utilized by the web server, the request identifying the web service by the second web service address that does not include an element that identifies the name of the web service.

21. The computer readable storage medium of claim 13 further comprising code for receiving a request from the user for the web service utilized by the web server, the request identifying the web service by the second web service address that does not include an element that identifies the name of the web service.

22. The method of claim 1, wherein the web service address comprising WSDL specifies an interface to the web service.

23. The apparatus of claim 7, wherein the web service address comprising WSDL specifies an interface to the web service.

24. The computer readable storage medium of claim 13, wherein the web service address comprising WSDL specifies an interface to the web service.

* * * * *